United States Patent [19]

Vickers

[11] Patent Number: 4,827,811
[45] Date of Patent: May 9, 1989

[54] TAMPER-RESISTANT FASTENER AND TOOL FOR OPERATING SAME

[75] Inventor: James H. Vickers, Middletown Township, Delaware County, Pa.

[73] Assignee: Southco, Inc., Concordville, Pa.

[21] Appl. No.: 132,078

[22] Filed: Dec. 11, 1987

[51] Int. Cl.$^4$ .............................................. B25B 7/02
[52] U.S. Cl. ................................................... 81/436
[58] Field of Search .................. 81/436; 411/403, 407, 411/408, 424, 426, 910, 410

[56] References Cited

U.S. PATENT DOCUMENTS

| | | | |
|---|---|---|---|
| 755,804 | 3/1904 | Smith | 411/910 |
| 2,397,216 | 3/1946 | Stellin . | |
| 2,770,998 | 11/1956 | Schwartz . | |
| 3,213,719 | 10/1965 | Kloack | 81/436 |
| 4,258,596 | 3/1981 | Bisbing . | |

FOREIGN PATENT DOCUMENTS

| | | | |
|---|---|---|---|
| 2608892 | 8/1977 | Fed. Rep. of Germany | 81/436 |
| 1234436 | 6/1971 | United Kingdom | 411/403 |

OTHER PUBLICATIONS

Rothbart, *Mechanical Design and Systems Handbook.*, McGraw-Hill (1964); pp. 27–15.

Primary Examiner—Frederick R. Schmidt
Assistant Examiner—Lawrence Cruz
Attorney, Agent, or Firm—Paul & Paul

[57] ABSTRACT

A tamper-resistant torque-responsive fastener is provided having a head and a shank, wherein the head is provided with a socket therein having a substantially triangular shape with rounded corners and curved sides, each of the rounded corners being defined by an arcuate path of a first radius and each curved side generally opposite the rounded corner being defined by the arcuate path of a second radius, whereby the dimensions across the socket remain constant and equal to the sum of the first and second radii. The second radius is of greater length than the first radius and is preferably between 2 and 4 times as long as the first radius. Also provided is a driving tool for operating the fastener.

11 Claims, 1 Drawing Sheet

TAMPER-RESISTANT FASTENER AND TOOL FOR OPERATING SAME

BACKGROUND OF THE INVENTION

This invention relates to tamper-resistant fasteners and, more particularly, to tamper-resistant fasteners of the "specialty head" type.

Fasteners which resist removal by conventional means, such as screw drivers, hex keys, and the like are generally known in the art. Typically, such tamper-resistant fasteners are one of three general types: a one-way head, a breakaway head, or a specialty head. The one-way head fastener is typically driven in one direction by conventional means but cannot be driven in the opposite direction. Thus, such fasteners are essentially permanent once installed. Similarly, the breakaway head fastener is typically driven by conventional tools but can only be used once because a portion of the head breaks away from the fastener after use. The last of the three types, the specialty head fastener, is characterized by an unusually shaped recess in the head of the fastener into which is inserted a special tool having a suitably shaped end for the transmission of torque to the fastener. The specialty head fastener is the only one of the three types which is capable of multiple use.

Specialty head fasteners, to which the present invention relates, are generally known in the art. Examples of such fasteners can be found in U.S. Pat. Nos. 3,369,441; 4,258,596; and 2,338,023. Known specialty head tamper-resistant fasteners, however, are not without their disadvantages. One common problem with specialty head fasteners is that as the shape of the recess or socket in the fastener head becomes more intricate and complex, the more difficult, time-consuming and expensive it is to manufacture the fastener and the tool. For example, U.S. Pat. No. 4,258,596 discloses a tamper-resistant fastener having a socket comprised of three circular recesses, at least one of which is eccentrically disposed with respect to the others. This fastener requires multiple drilling operations and the tool requires multiple turning operations which increase the time and expense of manufacturing.

Another disadvantage of the known specialty head fasteners is that common manufacturing processes do not lend themselves to produce the close tolerance limitations required for proper operation of the fastener. Consequently, a poor fit results between the tool and the socket which causes sticking or jamming of the tool when torque is applied to the fastener.

I have invented a new specialty head type tamper-resistant fastener which is exceptionally difficult to operate except by use of a specially designed tool and is thus highly tamper-resistant and yet can be manufactured to close tolerances by common manufacturing processes and is therefore cheaper and easier to manufacture than known tamper-resistant fasteners.

SUMMARY OF THE INVENTION

Briefly, the present invention comprises a fastener having a shank and a head connected thereto. The shank is preferably provided with a threaded portion adapted to be received within a tapped aperture. The head of the fastener is provided with a recess or socket in the face thereof, wherein the recess is substantially triangular in shape having rounded corners and curved sides and may also be described as having a tri-lobed circular shape. The corners of the socket have an arcuate curve defined by a first radius r and the side of the socket opposite the corner being an arcuate curved defined by a second radius R, wherein the ratio of the second radius to the first radius (R:r) is in the range of from about 2.0:1 to about 4.0:1, and wherein the dimension across the socket is equal to the sum of the two radii and remains constant. The head of the fastener is also preferably of a truncated cone shape to resist the application of torque to the fastener by gripping tool applied to the head. The constant dimension of R+r across the socket prevents the application of torque to the fastener by conventional tools, such as screwdrivers or hex keys, and thus provides a high degree of tamper-resistance to the fastener.

Accordingly, it is an object of the invention to provide a fastener having a high degree of resistance to the application of torque by conventional tools.

It is another object of the invention to provide a tamper-resistant fastener having a head and a shank, wherein the head of the fastener is provided with a tri-lobed circular recess therein.

It is another object of the invention to accomplish the above objects by providing a fastener having a tri-lobed circular recess wherein the lobes of the recess have an arcuate curve defined by a first radius and wherein the sides of the recess opposite the lobes have an arcuate curve defined by a second radius, and wherein the sum of the first radius and the second radius remains constant.

It is still another object of the invention to accomplish the above objects by providing a recess wherein the ratio of the second radius to the first radius is between 4:1 and 2:1.

It is another object of the invention to provide a tamper-resistant fastener having a head which is resistant to the application of torque which would be effective on the fastener.

It is yet another object of the invention to provide a tool having an end adapted to be received in the head of the fastener in matable engagement with the recess whereby torque can be applied to the fastener by the use of the tool.

It is yet another object of the invention to provide a tamper-resistant fastener and driving tool which are economical to manufacture.

It is still another object of the invention to provide a tamper-resistant fastener and driving tool which are not subject to jamming or sticking upon the application of torque.

These and other objects of the invention will become apparent upon a further reading of the specification with reference to the drawings and the appended claims.

DETAILED DESCRIPTION OF THE INVENTION

Figure 1:
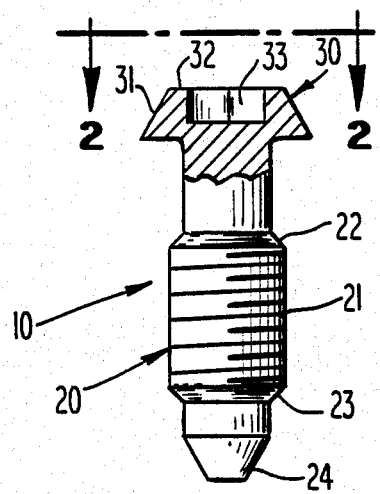
FIG. 1 is a side elevational view of one embodiment of a fastener in accordance with the present invention, with the head of the fastener being shown in section.

With reference first being made to FIG. 1, the present invention comprises a tamper-resistant fastener 10, having a shank 20 and a head 30 connected to shank 20. In the embodiment illustrated in FIG. 1, the fastener 10 comprises a screw-type fastener wherein the shank 20 of fastener 10 is provided with a threaded section 21 which is adapted to engage suitably tapped aperture upon application of torque to the fastener. The threaded section 21 is provided with beveled ends 22,23 which facilitate the proper alignment of threaded section 21 with the tapped aperture during operation of the fastener and help prevent binding of the fastener due to misalignment. The end 24 of shank 20 remote from the head 30, is likewise beveled to facilitate the proper alignment of the fastener with the aperture.

Figure 2:
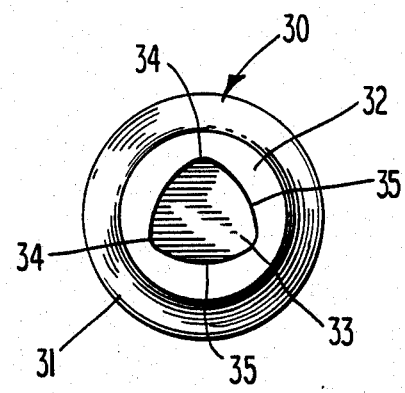
FIG. 2 is a front elevational view of the fastener of FIG. 1, slightly enlarged to show greater detail of the socket in the head thereof.

The head 30 of fastener 10 is affixed to shank 20 in substantially perpendicular orientation thereto. Head 30 is preferably circular in shape when viewed from the front (see FIG. 2) because such shapes are known to be more resistant to torque by use of a gripping tool than a polygonal-shaped head. Furthermore, as seen in FIG. 1, the head 30 is preferably of a truncated cone shape having a beveled wall 31 whereby a gripping tool, when applied to head 30, will not sufficiently engage head 30 to apply torque to the fastener.

Generally centrally located in the face 32 of head 30 is a socket 33 through which the fastener 10 is rotated by use of a specially designed tool, yet to be described. (See FIGS. 5–6) As perhaps best seen in FIGS. 2–4, socket 33 is of a substantially triangular shape having rounded corners 34 and curved sides 35. The shape of socket 33 may also be characterized as a tri-lobed circle. The shape of the socket 33 is defined by the arcuate curve of two radii about three points located on the axes of an equilateral triangle.

Figure 3:
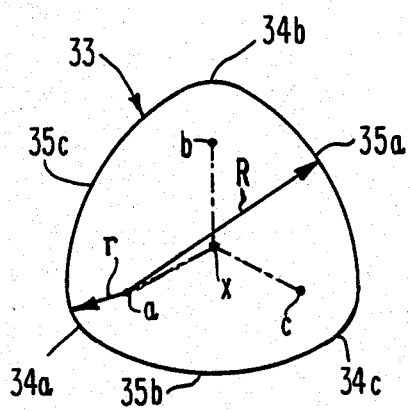
FIGS. 3 and 4 are schematic representations of the socket for use in a tamper-resistant fastener according to the present invention.
Figure 4:
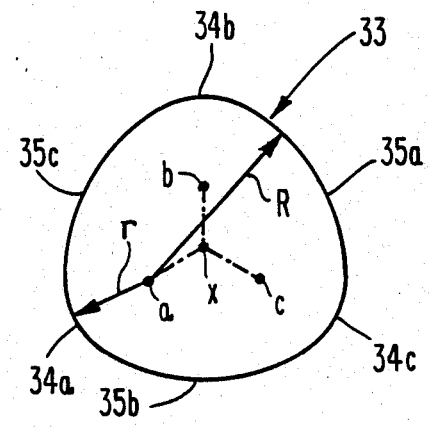

With reference to the schematic representations illustrated in FIGS. 3 and 4, each of the rounded corners 34a–34c of socket 33 is defined by the arcuate curve formed by a first radius "r" about points "a", "b" and "c", respectively, which are located on the axes of an equilateral triangle. Each point "a"–"c" is located an equal distance from the center "x" of the socket which is also the center of the equilateral triangle. The curved sides 35a–35c of socket 33 opposite each of the rounded corners 34a–34c, respectively, are defined by the arcuate path of radius "R" about the same points "a", "b" and "c" for the rounded corner 34a–34c, respectively. For example, corner 34a is defined by the arcuate path of radius "r" about point "a" and side 35a is defined by the arcuate path of radius "R" about point "a". As such, the dimension of socket 33 from any corner 34 to its opposing side 35 remains constant and equal to the sum of radius "r" and radius "R". Thus, conventional tools such as screwdrivers and hex keys cannot be wedged within socket 33, but rather rotate within the socket, thus making the fastener highly tamper-resistant.

In the preferred embodiment, radius "r" is of a constant dimension whereby any point along rounded corners 34a–c is an equal distance from its corresponding center of rotation a–c, respectively, and radius "R" remains constant whereby the distance between the curved sides 35a–c and points a–c, respectively, also remains constant. It is to be understood, however, that radii "r" and "R" may be of variable dimensions, so long as the sums of "r" and "R" remain constant across the socket 33.

As is obvious from the above description, the relationship between radius "r" and radius "R" is a critical feature of the invention and, of course, radius "R" must be greater than radius "r". It has been found that the ratio R:r in the range of from about 2.3:1 (as seen in FIG. 4) to about 4:1 (as seen in FIG. 3) produce a socket which provides superior tamper-resistant properties and yet offers sufficient interference for the transmission of torque when the appropriate tool is engaged with the socket.

Figure 5:
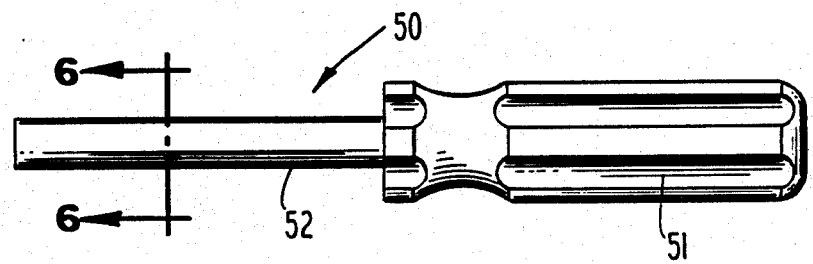
FIG. 5 is a side view of a tool for use in operation of a fastener in accordance with the present invention.
Figure 6:
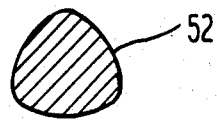
FIG. 6 is a sectional view of the shaft of the tool of FIG. 5 taken along line 6—6 of FIG. 5.

The present invention also comprises a driving tool for use in operating the tamper-resistant fastener just described, which tool is illustrated in FIGS. 5–6. As seen in the Figures, the tool 50 comprises a handle 51 connected to a shaft 52. In cross-section, shaft 52 is of such size and shape so as to correspond with the size and shape of socket 33. That is, shaft 52, in cross-section, as seen in FIG. 6, is of a substantially triangular configuration having rounded corners and curved sides. The dimensions of the shaft are such that shaft 52 will be closely received in matable engagement within socket 33, whereby torque applied to tool 50, in either direction, will be transmitted to fastener 10 through socket 33. It is preferable for shaft 52 to have the cross-sectional shape as seen in FIG. 6 along its entire length because such a shaft can easily be produced by cold forming or like methods. It is to be understood, however, that shaft 52 may be cylindrical in shape and milled or otherwise formed at an end thereof to produce an appropriate socket-engagable projection, if desired.

As will be apparent to one skilled in the art, the socket 33 in fastener head 30 can readily be manufactured by cold forming or by broaching, both of which are close-tolerance, high-production methods common to the fastener industry. The tool 50 and shaft 52 thereof, can likewise be formed by economical close-tolerance methods known in the fastener industry.

It is evident that the objects of the present invention have been amply fulfilled by the fastener disclosed herein. It is to be understood, however, that particular embodiments of the invention have been described for purposes of illustration only, and the invention is not to be construed as limited to the particular embodiments discussed and illustrated. For example, the particular fastener disclosed herein is a screw-type fastener having a threaded shank. It is to be understood, however, that the principles of the present invention are equally suitable for use in any fastener which operates by the application of torque. Likewise, it is to be understood that the present invention is not to be limited to fastener heads having a truncated cone shape, and the invention disclosed herein may also be used in recessed fastener heads or in combination with an external rotating cup or other means for resisting the application of torque to the fastener head by a gripping tool. Other modifications or alternatives may suggest themselves to one skilled in the art, all of which are intended to be within the spirit and scope of the present invention as defined in the appended claims.

What is claimed is:

1. A tamper-resistant torque-responsive fastener comprising:
    (a) a head;
        (1) said head having a socket therein;

(2) said socket having a substantially triangular shape with rounded corners and curved sides;
(3) rounded corners being defined by an arcuate path of a first radius;
(4) said curved sides generally opposite said rounded corners being defined by an arcuate path of a second radius;
(5) wherein said second radius is greater than said first radius;
(6) wherein said first and second radii share a common center of rotation;
(7) wherein the distance across said socket from said rounded corners to said curved sides is constant and is equal to the sum of said first radius and said second radius;
(8) wherein said second radius is from about 2 to about 4 times as great as said first radius; and
(b) a rotatable member connected to said head, said member being rotatably movable in response to the application of torque to said head.

2. The fastener of claim 1, wherein said second radius is about 2.3 times as great as said first radius.

3. The fastener of claim 1, wherein said second radius is about 4.0 times as great as said first radius.

4. The fastener of claim 1, wherein said head further comprises a peripheral sidewall adapted to resist the application of torque to said head which will be effective on said rotatable member.

5. The fastener of claim 1, wherein said rotatable member comprises a shank.

6. In combination:
(A) a tamper-resistant torque-responsive fastener comprising:
(1) a head;
(a) said head having a socket therein; said socket having a generally triangular shape with rounded corners and curved sides;
(b) said rounded corners of said socket being defined by an arcuate path of a first radius;
(c) said curved sides generally opposite each of said rounded corners being defined by an arcuate path of a second radius;
(d) wherein said second radius is greater than said first radius;
(e) wherein said first and second radii share a common center of rotation;
(f) wherein the distance across said socket is constant and is equal to the sum of said first and second radii;
(g) wherein said second radius is from about 2 to about 4 times as great as said first radius;
(2) a rotatable member connected to said head, said member being rotatably movable in response to the application of torque to said head; and
(B) a tool for applying torque to said tamper-resistant torque-responsive fastener, said tool comprising:
(1) a handle;
(2) a shank connected to said handle and longitudinally extending therefrom;
(3) at least a portion of said shank having a cross-sectional configuration substantially corresponding in size and shape of said socket so as to be inserted into matable engagement with the socket of said fastener.

7. The combination of claim 6, wherein said head further comprises a peripheral sidewall adapted to resist the application of torque to said head which will be effective on said rotatable member.

8. The combination of claim 6, wherein said second radius is about 2.3 times as great as said first radius.

9. The combination of claim 6, wherein said second radius is about 4 times great as said first radius.

10. The combination of claim 6, wherein said rotatable member comprises a shank.

11. A tamper-resistant torque-responsive fastener in combination with a tool for applying torque to said fastener;
(A) said tamper-resistant fastener comprising:
(1) a shank having a threaded portion adapted for engagement with a tapped aperture;
(2) a head connected to said shank, said head having a peripheral sidewall beveled downwardly and outwardly toward said shank;
(3) a socket in said head, said socket having a generally triangular shape with rounded corners and curved sides;
(4) each of said rounded corners of said socket having a corresponding center of rotation, wherein said rounded corner is defined by an arcuate path of a first radius of constant dimension rotating about said center of rotation corresponding to said rounded corner;
(5) wherein each of said curved sides generally opposite each of said rounded corners is defined by an arcuate path of a second radius of constant dimension rotating about said center of rotation corresponding to said rounded corner, whereby the distance across said socket from any of said rounded corners to said curved side generally opposite said rounded corner remains constant and equal to the sum of said first radius and said second radius;
(6) wherein said second radius is between from about 2 to about 4 times as great as said first radius;
(7) wherein said rounded corners are disposed relative to one another so as to substantially correspond to the points of an equilateral triangle; and
(B) a tool for applying torque to said fastener, said tool comprising;
(1) a handle;
(2) a shank connected to said handle and longitudinally extending therefrom;
(3) said shank in cross-section having the shape of an equilateral triangle with rounded corners and curved sides, wherein the size and shape of said shank is such as to be inserted in matable engagement with the socket of said fastener.

* * * * *